May 6, 1930. J. JOHNSTON 1,757,717
INSULATED CONDUCTOR AND METHOD OF MANUFACTURING THE SAME
Filed June 5, 1923
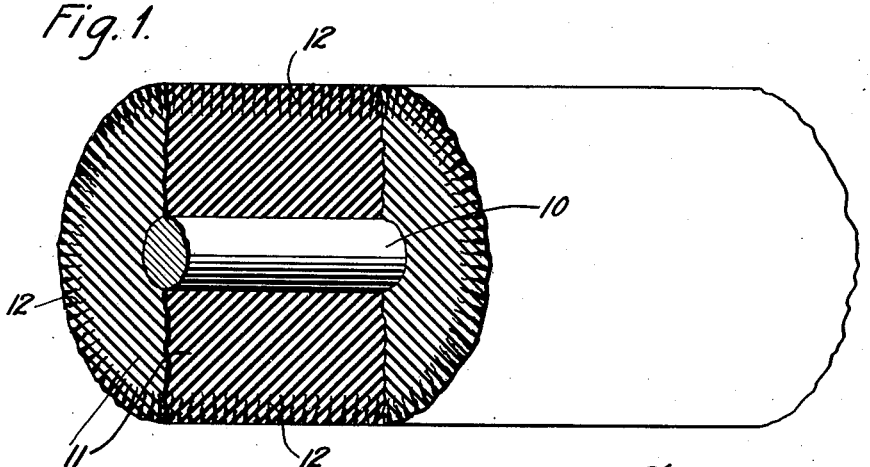
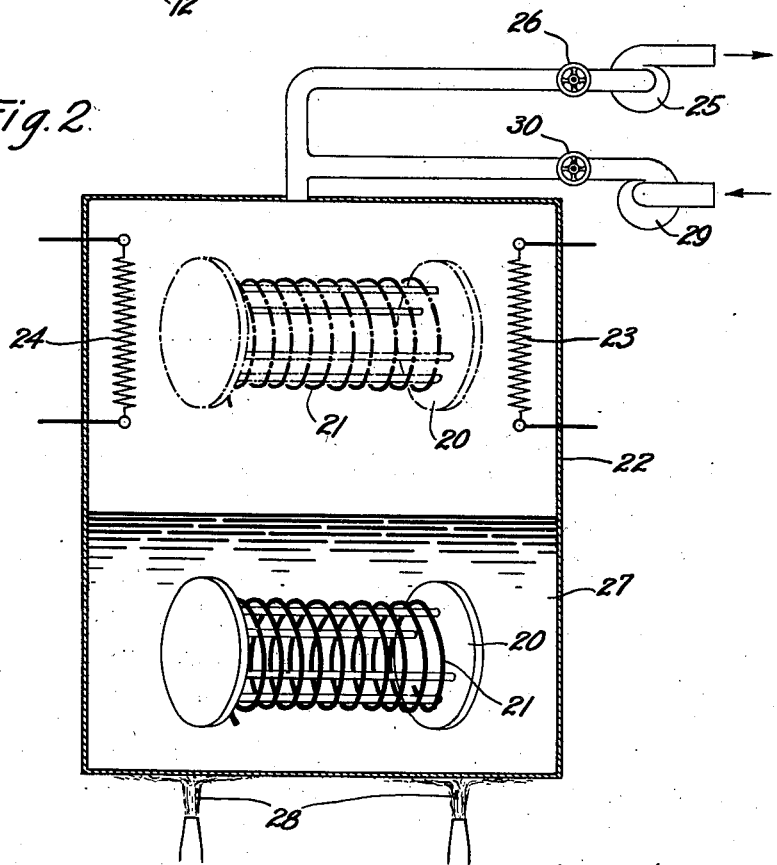
Inventor:
John Johnston,
by J.G.Roberts Atty Patented May 6, 1930

1,757,717

UNITED STATES PATENT OFFICE

JOHN JOHNSTON, OF NEW HAVEN, CONNECTICUT, ASSIGNOR TO WESTERN ELECTRIC COMPANY, INCORPORATED, OF NEW YORK, N. Y., A CORPORATION OF NEW YORK

INSULATED CONDUCTOR AND METHOD OF MANUFACTURING THE SAME

Application filed June 5, 1923. Serial No. 643,506.

This invention relates in general to electrical cables and more particularly to the insulating material for submarine cables.

The object of this invention is to provide an insulating material, the electrical characteristics of which do not vary materially with time when it is employed as the insulation for submarine cables, and to provide a method of preparing such insulation.

When rubber insulation, as ordinarily compounded and fashioned, is immersed in water, it slowly and progressively absorbs water in amounts which may range up to about 20% by weight and this absorption of water is accompanied by changes in its electrical characteristics. Accordingly in the manufacture of submarine cables, rubber as an insulating material has been considered very much inferior to gutta-percha which has the reputation of being stable in its electrical characteristics when immersed in water. However, rubber insulation may be made, the electrical characteristics of which are initially comparable with those of gutta-percha insulation and at a much lower cost. Elaborate tests have therefore been made to devise methods of treating rubber, whereby its electrical constants are rendered more stable and as a result of these tests, made on a large number of specially prepared samples, the method described herein has been established whereby it is possible to decrease the amount of absorption by the rubber insulation of the cable or to minimize the adverse effect upon its electrical constants of such absorption as does occur. The word "absorption" is used in the general sense and not to convey any implication as to the precise mechanism by which the water enters the material or is held by it; the rubber behaves as if it had a porosity toward certain substances, the pores being microscopic or even submicroscopic.

In accordance with the present invention, the insulating material, after it has been fashioned, is first treated to expel moisture and is then immersed in a substance, in the liquid state, having suitable dielectric properties so that this liquid may be absorbed before the insulation is exposed to water or a water solution, the absorption of which would have a deleterious effect on the electrical constants of the cable. It has been found that melted paraffin is a suitable liquid for this purpose but many other substances or mixtures of substances can be used, the important feature of the method being to bring the insulation in contact with a substance of appropriate properties and under appropriate conditions.

In the preferred method of treating rubber-covered submarine cables in accordance with this invention, the cable after being fashioned, is first baked to drive out moisture and is then dipped in melted paraffin where it remains for a time sufficient to permit it to take up the optimum amount of paraffin. If this optimum amount is exceeded the insulation may take up sufficient paraffin to affect its mechanical properties adversely and particularly to increase its dimensions. Thus by supplying the optimum amount of paraffin to the outer surface of the rubber, a high degree of imperviousness to moisture is obtained, at the same time as the mechanical properties and dimensions are only negligibly affected. In other words, the paraffin is caused to penetrate the rubber to a comparatively small depth; the depth being large enough to insure that an impervious layer exists at the outer surface of the rubber, and yet small enough to insure that only a limited amount of rubber is subjected to dimensional changes or deleterious effects upon its mechanical properties due to the filling of its pores with paraffin.

For ease in handling, the cable is first wound upon a lattice-work or skeleton reel which is then suspended in a chamber the temperature of which preferably is maintained at approximately 200° F. This chamber is provided with suitable evacuating means for withdrawing all water vapor driven out of the insulating material. After a period of time sufficient to permit the expulsion of the water occluded in the insulation, approximately four hours for the common size of submarine cable, the cable is impregnated by lowering it by suitable means into a tank of melted paraffin located in the lower part of the chamber. The time required for satisfactory impregnation is approximately fifteen minutes under conditions of atmospheric pressure, but if the impregnation is done under higher pressure, a somewhat shorter period may suffice. After impregnation, the reel is removed from the tank and all excess liquid allowed to drain off.

In the accompanying drawing, Fig. 1 is a view with parts broken away showing an insulated conductor in accordance with this invention, and Fig. 2 is a diagrammatical indication of the essential parts of an equipment for carrying out the method of treating a cable in accordance with this invention.

As shown in Fig. 1, the cable consists of a central conductor 10, surrounded by a heavy layer 11 of vulcanized rubber 12 which has been treated in accordance with the method outlined above. By this treatment, the outer layer 12 of the rubber insulation 11 has been impregnated with paraffin to form a comparatively thin continuous layer impervious to water.

In the equipment shown in Fig. 2, 20 is the skeleton reel upon which the cable 21 is wound for treatment. 22 is the closed chamber, the temperature of which is maintained at approximately 200° F. by means of the electrical heating elements 23, 24 supplied with energy from any convenient source, not shown; 25 is the evacuating means, which may be an air pump of any convenient design and which may be connected to the chamber 22 by a valve 26. In the lower part of the chamber 22 is a supply of melted paraffin 27, sufficient to permit the reel with the cable to be completely immersed therein. The paraffin may be kept in its liquid state by separate sources of heat 28. An air pump 29 of any convenient design may be connected by means of valve 30 to the chamber 22 to increase the air pressure in this chamber above that of the atmosphere, if desired.

In carrying out the process in accordance with this invention, the reel 20 with a supply of cable 21 is first placed in the chamber 22 and there heated for four hours to a temperature of 200° F. by means of heating elements 23, 24. During this heating a vacuum is maintained in the chamber 22 by means of the evacuating pump 25. While still hot and under vacuum, the reel is lowered into the melted paraffin at the bottom of chamber 22, and an air pressure, which may correspond to that of the atmosphere, is applied to the surface of the paraffin. If it be desired, a higher pressure may be supplied by means of the air pump 29. Under ordinary circumstances, the reel is left submerged for fifteen minutes and is then, by means not shown, again placed in the upper part of chamber 22, where it is left a sufficient length of time to permit excess paraffin to drain off.

While it is preferable to maintain the cable under vacuum when driving off the moisture and to impregnate it under pressure, it is obvious that satisfactory results may be obtained without resorting to vacuum and pressure by suitably regulating the heating and impregnating periods to meet the changed conditions. An elaborate series of tests has demonstrated that rubber treated in accordance with this invention is sufficiently stable in its electrical properties to permit its being used in place of gutta-percha as the insulting material for long submarine cables. Although the invention is described as applied to a submarine cable, it is believed to be perfectly obvious that the same method of treatment would be of similar advantage when applied to a conductor similarly insulated which in service is subjected to conditions of high humidity, temporary or permanent.

What is claimed is:

1. An insulated cable comprising an electrical conductor having a layer of rubber fashioned thereabout, and a water resistant material having high dielectric properties filling only the pores at and a comparatively short distance below the outer surface of the rubber formed during its fashioning.

2. An insulated cable comprising an electrical conductor having a coating of rubber fashioned thereabout, and water resistant material having high dielectric properties clogging the pores at the outer surface of the rubber formed during its fashioning, the clogging of said pores with water resistant material extending to such a depth only, that the mechanical properties and the dimensions of the cable are substantially unaffected.

3. An insulated cable comprising an electrical conductor and a layer of rubber fashioned thereabout, the pores throughout said layer of rubber being substantially free from moisture and occluded gases, and the pores located only at and immediately below the outer surface of said layer of rubber being filled with a water resistant material.

4. The method of increasing the resistance to water penetration of rubber insulated conductors, which comprises fashioning rubber to form a layer about a central conductor, heating the insulated conductor under a vacuum to drive out moisture from the pores throughout the depth of said layer of rubber, and filling the pores to a comparatively small depth below the outer surface of said layer of rubber with water resistant material.

5. The method of increasing the resistance to the absorption of water, of a rubber insulated conductor having a heavy layer of rubber insulation, which method consists in maintaining the insulated conductor at a temperature of approximately 200° F. for a period of several hours and then clogging the pores to a comparatively small depth at and below the outer surface of said rubber insulation by immersing the insulated conductor in a bath of liquid paraffin for a period of approximately fifteen minutes.

6. An insulated conductor having a layer of rubber insulating material surrounding a conducting core, said layer having an inner main region which is water absorbent and which is completely surrounded by a thin outer region in which the pores of said material are filled with a water resistant material having high dielectric properties.

7. The method of rendering waterproof an insulated conductor having a water absorbent rubber insulation which comprises the step of impregnating to a small depth the total outer surface of said water absorbent rubber insulation with a water resistant material.

In witness whereof, I hereunto subscribe my name this 31st day of May A. D., 1923.

JOHN JOHNSTON.